US012686403B2

(12) United States Patent
Doi

(10) Patent No.: US 12,686,403 B2
(45) Date of Patent: Jul. 21, 2026

(54) ALERT APPARATUS AND ALERT METHOD OF A VEHICLE

(71) Applicant: TOYOTA JIDOSHA KABUSHIKI KAISHA, Aichi (JP)

(72) Inventor: Tomoyuki Doi, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 10 days.

(21) Appl. No.: 18/909,948

(22) Filed: Oct. 9, 2024

(65) Prior Publication Data

US 2025/0128728 A1 Apr. 24, 2025

(30) Foreign Application Priority Data

Oct. 24, 2023 (JP) ................................. 2023-182237

(51) Int. Cl.
  *B60W 50/14* (2020.01)
  *B60W 30/16* (2020.01)
(52) U.S. Cl.
  CPC ............ *B60W 50/14* (2013.01); *B60W 30/16* (2013.01); *B60W 2050/143* (2013.01);
  (Continued)
(58) Field of Classification Search
  CPC ................. B60W 50/14; B60W 30/16; B60W 2554/406; B60W 2554/802;
  (Continued)

(56) References Cited

U.S. PATENT DOCUMENTS 6,233,516 B1 * 5/2001 Egawa .................. B60W 30/16
                                                              356/3
6,785,611 B2 * 8/2004 Ibrahim ................ B60W 30/16
                                                              340/436
(Continued)

FOREIGN PATENT DOCUMENTS

JP      H06-231400 A     8/1994
JP      2005-178518 A    7/2005
JP      6447465 B2       1/2019

OTHER PUBLICATIONS

JP2002362268 (Year: 2002).*

*Primary Examiner* — Thomas D Alunkal
(74) *Attorney, Agent, or Firm* — Hauptman Ham, LLP

(57) ABSTRACT

A driving support ECU of an alert apparatus obtains, when a preceding vehicle comes closer to a host vehicle rapidly in a following preceding vehicle state in which the host vehicle is following the preceding vehicle owing to a driving operation by a host vehicle driver, operation characteristics values representing characteristics of a deceleration operation performed by the host vehicle driver to decelerate the host vehicle, and memorize operation characteristics learning values that vary depending on the operation characteristics values. The ECU obtains an assumed deceleration of the preceding vehicle in accordance with a type of a road and/or a traffic flow. The ECU calculates a "required inter-vehicular distance" using the assumed deceleration, and performs the alert operation when an alert condition is determined to be satisfied. The alert condition includes a condition to be satisfied when an inter-vehicular distance is shorter than the required inter-vehicular distance.

1 Claim, 6 Drawing Sheets

(52) U.S. Cl.
CPC ... *B60W 2050/146* (2013.01); *B60W 2520/10* (2013.01); *B60W 2554/406* (2020.02); *B60W 2554/802* (2020.02)

(58) Field of Classification Search
CPC ..... B60W 2050/143; B60W 2050/146; B60W 2520/10
See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 9,796,384 B2 * | 10/2017 | Nemoto | B60W 30/16 |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 11,066,072 B2 * | 7/2021 | Kim | B60W 30/17 |
| 11,919,533 B2 * | 3/2024 | Kakeshita | G06V 20/58 |
| 2005/0128063 A1 * | 6/2005 | Isaji | B60W 40/10 340/576 |
| 2005/0137775 A1 | 6/2005 | Sekiguchi | |
| 2009/0299578 A1 * | 12/2009 | Lucas | B60R 21/01332 701/45 |
| 2011/0137508 A1 * | 6/2011 | Garcia Manchado | G07C 5/004 701/123 |
| 2017/0369055 A1 * | 12/2017 | Saigusa | B60W 30/095 |
| 2019/0295419 A1 | 9/2019 | Tosa et al. | |
| 2023/0076404 A1 * | 3/2023 | Fuwa | B60W 30/095 |

* cited by examiner

ALERT APPARATUS AND ALERT METHOD OF A VEHICLE

RELATED APPLICATIONS

The present application claims priority to Japanese Patent Application No. 2023-182237, filed Oct. 24, 2023, the disclosure of which is hereby incorporated by reference herein in its entirety.

TECHNICAL FIELD

The present disclosure relates to an alert apparatus of a vehicle that performs an alert operation to alert a host vehicle driver (call a driver's attention of a host vehicle) when an inter-vehicular distance between a host vehicle and a preceding vehicle is short. The present disclosure also relates to an alert method thereof.

BACKGROUND

One of conventional alert apparatuses (hereinafter, referred to as a "conventional apparatus"), disclosed in Japanese Patent Application Laid-Open No. H06-231400, estimates a maximum value of a shortened amount of the inter-vehicular distance between the host vehicle and the preceding vehicle (i.e., a maximum distance-of-coming-closer-to-each-other), based on a preceding vehicle speed, a deceleration of the preceding vehicle, a host vehicle speed, an assumed deceleration of the host vehicle, and a free running time (brake lag time) of the host vehicle that is a time length up to a time point at which the host vehicle starts to be braked.

The conventional apparatus issues an alert when a current inter-vehicular distance between the host vehicle and the preceding vehicle is equal to or shorter than an "appropriate inter-vehicular distance" determined based on the estimated maximum distance-of-coming-closer-to-each-other.

SUMMARY

The above-described conventional apparatus calculates the maximum distance-of-coming-closer-to-each-other and the appropriate inter-vehicular distance, using an actual deceleration of when the preceding vehicle starts to decelerate. However, even before the preceding vehicle starts to decelerate, it is preferable to issue an alert in preparation for an abrupt deceleration of the preceding vehicle if the inter-vehicular distance is short while the host vehicle is running to follow the preceding vehicle. In order to do so, it is necessary to calculated the maximum distance-of-coming-closer-to-each-other based on an assumed deceleration of the preceding vehicle. The deceleration of the proceeding vehicle fluctuates greatly according to traffic situations (e.g., whether a road is a limited highway or an ordinary road, and whether a flow of the traffic (or the traffic flow) is a congestion flow or a free flow). Therefore, if the maximum distance-of-coming-closer-to-each-other and the appropriate inter-vehicular distance are calculated based on the assumption that the preceding vehicle decelerates at the assumed constant deceleration, their values may greatly differ from appropriate values. This may cause the alert to be issued at an inappropriate timing.

The present disclosure is made to cope with the above-described problem. Namely, one of objects of the present disclosure is to provide an alert apparatus and an alert method that are capable of performing an alert operation (e.g., displaying an alert and/or generating an alert sound) for calling the driver's attention to the preceding vehicle at a more appropriate timing.

One of embodiments of the present disclosure (hereinafter, referred to as a "present disclosure apparatus") comprises:

a first obtaining device (81-86) that obtains host vehicle information on a traveling state of a host vehicle, the host vehicle information including information on a host vehicle speed which is a speed of the host vehicle;

a second obtaining device (20, 30) that obtains preceding vehicle information including information on an actual inter-vehicular distance between a preceding vehicle and the host vehicle;

a third obtaining device (60, 61, 70) that obtains road traffic information including information on circumstances of a road on which the host vehicle is traveling;

an alert device (50-52) that performs, as an alert operation to call a host vehicle driver's attention, at least one of an alert display and an alert sound generation; and a controller (10) that controls the alert device, wherein, the controller is configured to:

obtain an assumed deceleration of the preceding vehicle in accordance with the obtained road traffic information (S305, S510-S540), the assumed deceleration being an imaginary deceleration of the preceding vehicle;

calculate a required inter-vehicular distance (S305-S392) which the host vehicle should ensure between the host vehicle and the preceding vehicle, based on the host vehicle information, the preceding vehicle information, and the obtained assumed deceleration of the preceding vehicle; and cause the alert device to perform the alert operation (S394), when an alert condition is determined to be satisfied, the alert condition including a condition to be satisfied when the obtained actual inter-vehicular distance is equal to or shorter than the calculated required inter-vehicular distance.

According to the present disclosure apparatus, since the assumed deceleration of the preceding vehicle being the imaginary deceleration of the preceding vehicle is obtained based on the obtained road traffic information (e.g., information on the type of the road, and/or the traffic flow), the required inter-vehicular distance is calculated based on a deceleration at which the preceding vehicle is likely to decelerate (i.e., a deceleration which is highly likely to be observed when the preceding vehicle is actually decelerating). Thus, the alert operation can be performed at a more appropriate timing.

One of embodiments of the present disclosure apparatus is configured to:

obtain, as operation characteristics values, (1) a reaction time that is a time (time length) from a time point at which a rapid approach condition becomes satisfied to a time point at which a brake pedal starts to be operated, (2) a deceleration of the host vehicle caused by an operation to the brake pedal after the rapid approach condition becomes satisfied, and (3) a deceleration change rate which is an increasing amount of the deceleration of the host vehicle per unit time caused by the operation to the brake pedal after the rapid approach condition becomes satisfied;

store, as operation characteristics learning values, (1A) a reaction time learning value varying depending on the obtained reaction time, (1B) a deceleration learning value varying depending on the obtained deceleration of the host vehicle, and (1C) a deceleration change rate learning value varying depending on the obtained deceleration change rate; and calculate, as the required inter-vehicular distance, a maximum distance-of-coming-closer-to-each-other that is a maximum value of an decreasing amount of the inter-vehicular distance up to a time point at which the host vehicle and the preceding vehicle come closest to each other or a value varying based on the maximum distance-of-coming-closer-to-each-other, based on the host vehicle speed, the reaction time learning value, the deceleration learning value, the deceleration change rate learning value, a preceding vehicle speed which is a current speed of the preceding vehicle, and the assumed deceleration of the preceding vehicle.

Notably, in the above description, in order to facilitate understanding of the present disclosure, the constituent elements corresponding to those of an embodiment which will be described later are accompanied by parenthesized symbols and/or names which are used in the embodiment; however, the constituent elements of the disclosure are not limited to those in the embodiment defined by the symbols and/or names. The present disclosure covers an alert method for a vehicle, and a program thereof.

DETAILED DESCRIPTION

Figure 1:
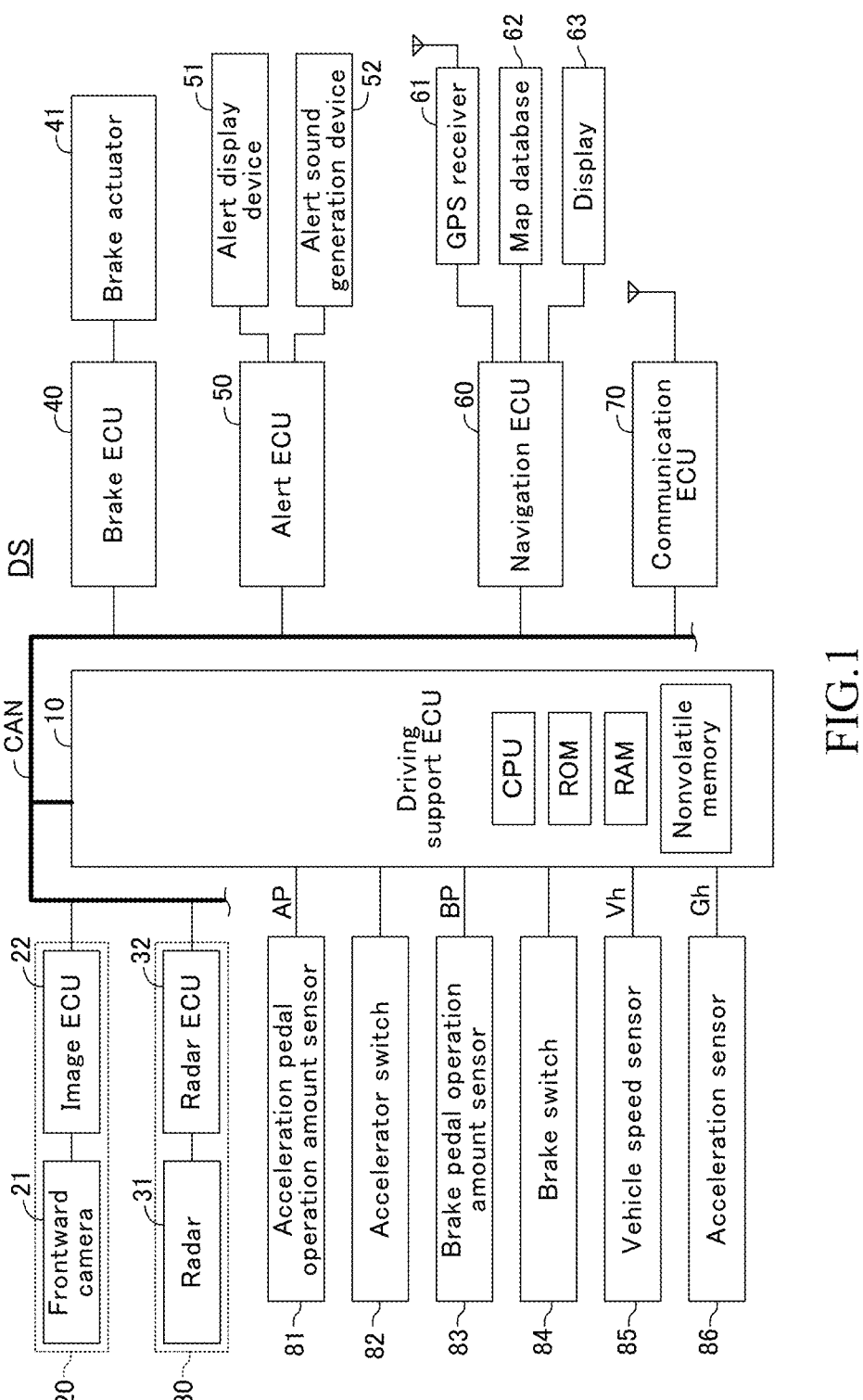
FIG. 1 is a schematic diagram of an alert apparatus of a vehicle according to an embodiment of the present disclosure.

An alert apparatus DS of a vehicle (hereinafter, referred to as an "apparatus DS") according to an embodiment of the present disclosure comprises components/elements illustrated in FIG. 1. The apparatus DS is applied to and/or is mounted on a host vehicle. The host vehicle is a vehicle having an internal combustion engine as a drive source, but may be an electric vehicle, or a hybrid vehicle.

In the present specification, an "ECU" means an electronic control unit, that includes a microcomputer as a main component. The microcomputer includes a CPU (processor), and storing devices including a ROM, a RAM, a data writable involatile memory, or the like. The ECU may sometimes be referred to as a "controller" or a "computer". A plurality of ECUs shown in FIG. 1 are connected to each other through Controller Area Network (CAN) in such a manner that they can exchange information with each other. A driving support ECU 10 performs an "inter-vehicular distance alert control" described later in detail.

A frontward camera device 20 includes a frontward camera 21 and an image ECU 22. The frontward camera 21 captures (or takes a picture of) a "scene in front of the host vehicle" so as to obtain image data, every time a predetermined time elapses. The image ECU 22 produces camera information by analyzing the image data sent from the frontward camera 21, and transmits the camera information to the driving support ECU 10. The camera information includes demarcation line information on "a position and a type of a demarcation line" and camera object information on "a position with respect to the host vehicle, a longitudinal relative speed, a lateral relative speed, and a type" of a captured/photographed object.

The radar device 30 is a well-known device configured to obtain information on an object in front of the host vehicle using electrical waves in a millimeter waveband, and includes a radar 31 and a radar ECU 32. The radar 31 transmits information on transmitted electrical waves and on received electrical waves (reflected electrical waves) to the radar ECU 32. The radar ECU 32 obtains radar information based on the information sent from the radar 31, and transmits the radar information to the driving support ECU 10. The radar information includes a distance to the object, an azimuth of the object, and a relative speed of the object. It should be noted that the relative speed of the object is positive when the object is coming closer to the host vehicle.

The driving support ECU 10 specifies a preceding vehicle based on the camera information and the radar information, and obtains an "inter-vehicular distance between the host vehicle and the preceding vehicle" and the "relative speed of the preceding vehicle". The preceding vehicle is an other vehicle that is present in a lane (host vehicle lane) in which the host vehicle is running, and that is running in the same direction as the host vehicle immediately in front of the host vehicle.

A brake ECU 40 drives a brake actuator 41 to thereby control a brake device of the host vehicle. More specifically, the brake ECU 40 adjusts the brake force applied to the host vehicle in such a manner that a deceleration (a negative acceleration) of the host vehicle becomes greater as a brake pedal operation amount BP detected by a brake pedal operation amount sensor 83 described later becomes greater.

An alert ECU 50 causes an alert/warning display device 51 to display an alert/warning, and causes an alert sound generation device 52 to generate an alert sound, in response to an instruction sent from the driving support ECU 10.

A navigation ECU 60 is connected to a GPS receiver 61, a map database 62, and a display touch panel 63. The navigation ECU 60 estimates a current position of the host vehicle based on GPS signals received by the GPS receiver 61. The navigation ECU 60 obtains, based on the estimated current position of the host vehicle and information stored in the database 62, information on the road to which the current position of the host vehicle belongs. The information on the road includes a type of the road (a road type) on which the host vehicle is currently traveling (i.e., road type information indicating whether the road is a limited highway or an ordinary road).

The communication ECU 70 obtains various information from an external equipment (e.g., a roadside device, and an information center that provides information including traffic jam information and road works information) through communication with the external equipment. The information (including the traffic jam information) obtained from the external equipment includes a type of the road (the road type) on (or the lane in) which the host vehicle is currently traveling, and "a density k of vehicles and a volume q of traffic" of the road. The density k of vehicles means the number of vehicles per a single lane, the vehicles being present within "an area of a predetermined distance (e.g., 1 km) from the current position of the host vehicle. The volume q of traffic means the number of vehicles passing through the current position of the host vehicle or a position in the vicinity of the current position of the host vehicle in the same lane as the lane in which the host vehicle is currently traveling, per a unit time (e.g., 1 hour).

The driving support ECU 10 receives detected values (output values) of sensors and switches described below.

An acceleration pedal operation amount sensor 81 that detects an operation amount AP of the acceleration pedal of the host vehicle.

An accelerator switch 82 that outputs an ON-signal when the accelerator pedal is in a state where the accelerator pedal is pressed, and that outputs an OFF-signal when the accelerator pedal is in a state where the accelerator pedal is not pressed (i.e. is released).

A brake pedal operation amount sensor 83 that detects an operation amount BP of the brake pedal of the host vehicle.

A brake switch 84 that outputs an ON-signal when the brake pedal is in a state where the brake pedal is pressed, and that outputs an OFF-signal when the brake pedal is in a state where the brake pedal is not pressed (i.e. is released).

A vehicle speed sensor 85 that detects a speed of the host vehicle (i.e., host vehicle speed Vh).

An acceleration sensor 86 that detects an acceleration G of the host vehicle in a front-rear direction. It should be noted that, in the present specification, a deceleration (a negative acceleration G) of the host vehicle in the front-rear direction is expressed as a positive value Gh ($=-G$).

(Outline of Operation)

The apparatus DS obtains values described below as "values representing (indicative of) characteristics of a deceleration operation performed by the driver of the host vehicle to decelerate the host vehicle (i.e., operation characteristics values)" when the preceding vehicle starts to rapidly come closer to the host vehicle in a state where the host vehicle has been traveling/running at the substantially same speed as the preceding vehicle speed to follow the preceding vehicle owing to the driving operation by the driver of the host vehicle (i.e., while a following preceding vehicle state is occurring).

(1) A time (time length) from a time point at which a rapid approach of the preceding vehicle is detected (i.e., a rapid approach detected time point at which a rapid approach condition becomes satisfied) to a time point at which the driver of the host vehicle starts performing the decelerating operation to decelerate the host vehicle. This time length (duration) may sometimes be referred to as a "reaction time" or a "free running time". A start time point of the decelerating operation is a time point at which the signal of the brake switch 84 changes from the OFF-signal to the ON-signal, but may be a time point at which the signal of the accelerator switch 82 changes from the ON-signal to the OFF-signal.

(2) A maximum value of a deceleration (maximum deceleration) of the host vehicle caused by a brake operation (press of the brake pedal) performed by the driver of the host vehicle after the rapid approach of the preceding vehicle is detected (the rapid approach condition becomes satisfied).

(3) An average of deceleration change rate (an increasing amount of the deceleration per unit time) before a time point at which the deceleration caused by the brake operation performed by the driver of the host vehicle after the rapid approach of the preceding vehicle is detected (the rapid approach condition becomes satisfied) reaches a maximum deceleration (or become the greatest). The average may be referred as an averaged deceleration change rate.

The apparatus DS obtains, through calculation, based on the above-described operation characteristics values (the reaction time, the maximum deceleration, and the deceleration change rate), operation characteristics learning values (including a reaction time learning value, a maximum deceleration learning value, and a deceleration change rate learning value) for each of inter-vehicular time ranges (time ranges) to which an inter-vehicular time (=the inter-vehicular distance/the host vehicle speed) of when the rapid approach of the preceding vehicle is detected corresponds. The apparatus DS stores the obtained operation characteristics learning values as the operation characteristics learning values for the respective inter-vehicular time ranges in the nonvolatile memory serving as a storing device.

When the host vehicle is traveling/running so as to follow the preceding vehicle owing to the driving operation by the driver of the host vehicle, the apparatus DS reads out (fetches) operation characteristics learning values (the reaction time learning value, the maximum deceleration learning value, and the deceleration change rate learning value) corresponding to the current inter-vehicular time from the nonvolatile memory. In addition, as described later, the apparatus DS sets an assumed deceleration of the preceding vehicle Gp to a value that varies depending on at least one of "a type of the road on which the host vehicle is traveling" and a flow type (traffic flow) which is either a free flow or a congestion flow. The apparatus DS obtains the current host vehicle speed Vh, and obtains, through calculation, a current preceding vehicle speed Vp based on the current host vehicle speed Vh and the relative speed Vr. Thereafter, the apparatus DS calculates the maximum distance-of-coming-closer-to-each-other using these values, and calculates a required inter-vehicular distance based on the maximum distance-of-coming-closer-to-each-other. It should be noted that the maximum distance-of-coming-closer-to-each-other is a maximum value of a change amount (i.e., a shortened distance) of the inter-vehicular distance in a period from a time point at which the preceding vehicle starts to come closer to the host vehicle to a time point at which the host vehicle comes closest to the preceding vehicle. The apparatus DS performs an alert display operation (to display an alert for calling the driver's attention of the host vehicle) and/or an alert sound generation operation (to generate the alert sound for calling the driver's attention of the host vehicle), when a "condition/state to be satisfied when the actual inter-vehicular distance is equal to or shorter than the required inter-vehicular distance" continues to occur for a constant time duration or longer.

(Specific Operation)

<Obtaining Learning Values>

The CPU of the driving support ECU 10 (hereinafter, simply referred to as a "CPU") executes a routine shown by a flowchart in FIG. 2, every time a predetermined time (calculation cycle) dt elapses.

Hereinafter, "step" is expressed as "S". When an appropriate time point comes, the CPU starts processing from S200 in FIG. 2, and proceeds to S210. At S210, the CPU determines whether or not a "rapid approach condition being a condition to become satisfied when the preceding vehicle and the host vehicle are coming closer to each other rapidly" becomes satisfied. The rapid approach condition is satisfied when the preceding vehicle is present and an inter-vehicular distance between the preceding vehicle and the host vehicle is decreasing rapidly. More specifically, at S210, the CPU determines whether or not the rapid approach condition becomes satisfied, by determining whether or not a relative speed increasing amount dVr is equal to or greater than a relative speed threshold dVrth. The relative speed increasing amount dVr is obtained by subtracting a relative speed Vrold a predetermined time before the present time point from a present/current relative speed Vr. When the rapid approach condition is not satisfied, the CPU proceeds directly to S295 from S210, so as to terminate the present routine tentatively.

Whereas, when the CPU determines that the rapid approach condition becomes satisfied, the CPU proceeds to S220 from S210, and determines whether or not a following preceding vehicle state has been continuing for a threshold time duration or longer just before the present time point. It should be noted that the CPU determines that the following preceding vehicle state condition is satisfied, and thus, the following preceding vehicle state is occurring, when the CPU determines that the preceding vehicle is present based on the camera information and the radar information, that the inter-vehicular distance Dint between the preceding vehicle and the host vehicle is equal to or shorter than a threshold distance Dth, and that the signal of the brake switch 84 (i.e., the brake signal) is the off signal. The inter-vehicular distance Dint is obtained based on the camera information and the radar information.

When the CPU determines that the following preceding vehicle state has been continuing for the threshold time duration or longer, the CPU proceeds to S230 from S220, and stores the inter-vehicular time Tint that is obtained by dividing the inter-vehicular distance Dint by the host vehicle speed Vh, as a value representing a current state/situation of when the rapid approach condition becomes satisfied.

Subsequently, the CPU proceeds to S240, and obtains the operation characteristics values (the reaction time Tre, the maximum deceleration Gmx, and the averaged deceleration change rate Ja) for a single deceleration operation performed in a state in which the preceding vehicle continues being present after the time point (S210: Yes) at which the rapid approach condition becomes satisfied.

The reaction time Tre is a time length from the time point at which the rapid approach condition is determined to become satisfied to the time point at which the decelerating operation is performed. Whether or not the decelerating operation has been performed is determined by determining whether or not the signal of the brake switch 84 has changed from the OFF-signal to the ON-signal. It should be noted that the CPU may determine that the decelerating operation has been performed, when the signal of the accelerator switch 82 has changed from the ON-signal to the OFF-signal.

The maximum deceleration Gmx is a maximum value of the deceleration of the host vehicle in a deceleration period from the time point at which the decelerating operation starts to be performed after the rapid approach condition is determined to become satisfied to either a time point at which the decelerating operation is ended or a time point at which the host vehicle fully stops, whichever earlier.

The averaged deceleration change rate Ja is an average of the deceleration change rates in a period from the time point at which the rapid approach condition is determined to be satisfied to a time point at which the deceleration of the host vehicle reaches the maximum deceleration. The deceleration change rate is an increase amount of the deceleration per unit time, and is equal to a sign-inverted value of a jerk (which is an acceleration change rate). It should be noted that the CPU stops obtaining the operation characteristics values, and proceeds to S295, when the preceding vehicle becomes no longer present.

When the CPU complete the obtainment of the operation characteristics values at S240, the CPU proceeds to S250. At step 250, the CPU updates the operation characteristics learning values (i.e., the reaction time learning value Tr, the maximum deceleration learning value Gm, and the deceleration change rate learning value Jm) corresponding to "the inter-vehicular time Tint representing a state of when the rapid approach condition is determined to satisfied" stored at S230, based on the respective operation characteristics values (i.e., the reaction time Tre, the maximum deceleration Gmx, and the averaged deceleration change rate Ja) obtained at S240, as described below. Thereafter, the CPU proceeds to S295.

Figure 2:
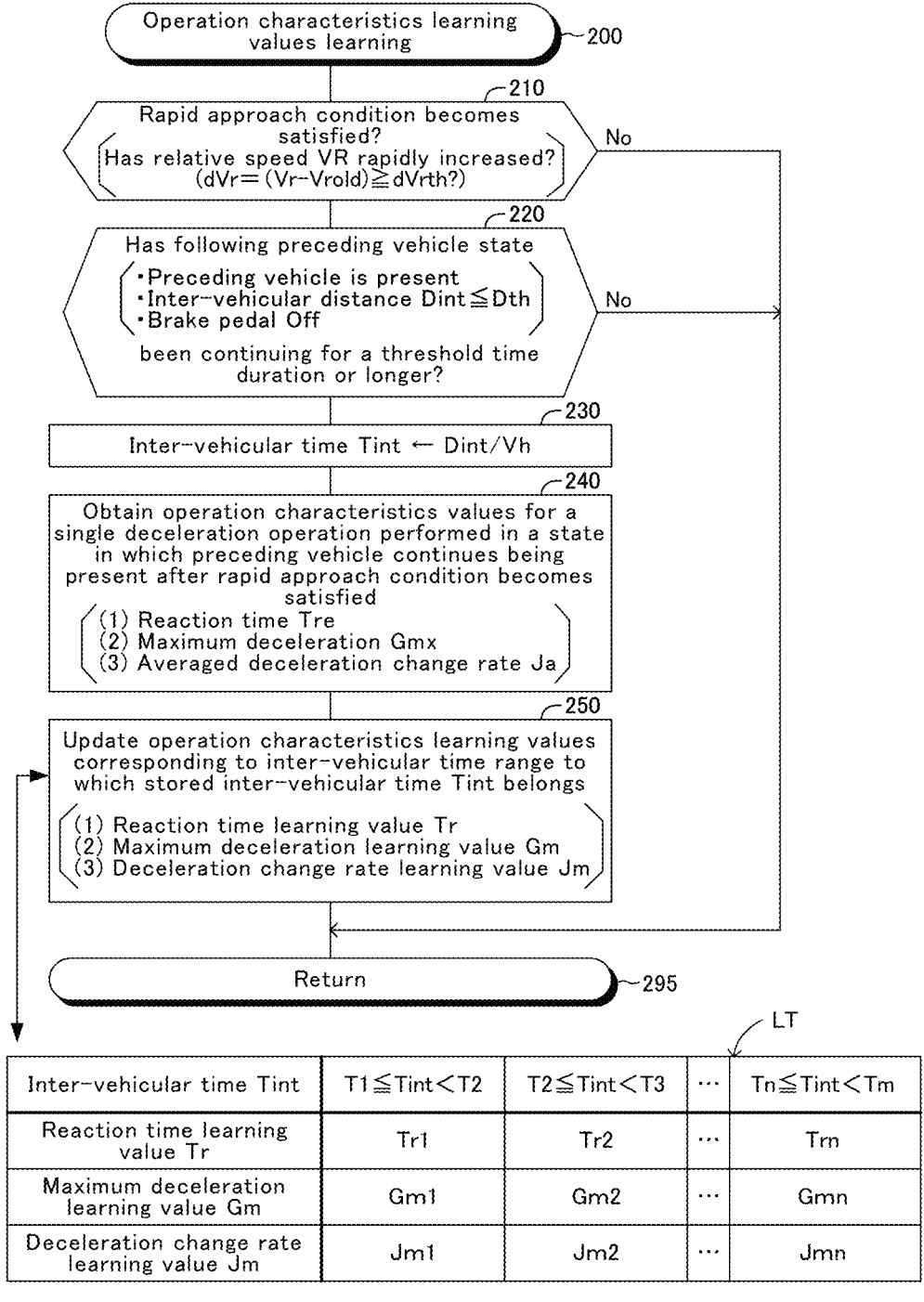
FIG. 2 shows a routine executed by a CPU of a driving support ECU shown in FIG. 1.

The driving support ECU 10 has been stored a look-up table LT shown in FIG. 2 in the nonvolatile memory. In this lookup table LT, the inter-vehicular time is divided into a plurality of inter-vehicular time ranges (time ranges), and the operation characteristics learning values (i.e., Tr, Gm, and Jm) are stored for each of the inter-vehicular time ranges.

The CPU reads out the reaction time learning value Tr that corresponds to the inter-vehicular time range to which the inter-vehicular time Tint stored at S230 belongs, from the lookup table LT. For example, when the inter-vehicular time Tint stored at S230 is between T2 and T3, the CPU reads out (fetches) the reaction time learning value Trn (n=2) that corresponds to the inter-vehicular time range to which the inter-vehicular time Tint belongs, from the lookup table LT. Subsequently, the CPU applies the reaction time Tre obtained at S240 and the read out "reaction time learning value Trn (n is a natural number from 1 to m)" to a right side of an equation (Tr=α·Tre+(1−α)·Trn) so as to update the reaction time learning value Tr (=Trn). The CPU stores the updated reaction time learning value Tr (=Trn) into the lookup table LT, as the reaction time learning value Tr corresponding to the inter-vehicular time range to which the inter-vehicular time Tint stored at S230 belongs. Here, a is a predetermined value between "0" and "1".

The CPU reads out the maximum deceleration learning value Gm that corresponds to the inter-vehicular time range to which the inter-vehicular time Tint stored at S230 belongs, from the lookup table LT. For example, when the inter-vehicular time Tint stored at S230 is between T2 and T3, the CPU reads out (fetches) the maximum deceleration learning value Gmn (n=2) that corresponds to the inter-vehicular time range to which the inter-vehicular time Tint belongs, from the lookup table LT. Subsequently, the CPU applies the maximum deceleration Gmx obtained at S240 and the read out "maximum deceleration learning value Gmn (n is a natural number from 1 to m)" to a right side of an equation (Gm=α·Gmx+(1−α)·Gmn) so as to update the maximum deceleration learning value Gm (=Gmn). The CPU stores the updated maximum deceleration learning value Gm (=Gmn) into the lookup table LT, as the maximum deceleration learning value Gm corresponding to the inter-vehicular time range to which the inter-vehicular time Tint stored at S230 belongs.

The CPU reads out the deceleration change rate learning value Jm that corresponds to the inter-vehicular time range to which the inter-vehicular time Tint stored at S230 belongs, from the lookup table LT. For example, when the inter-vehicular time Tint stored at S230 is between T2 and T3, the CPU reads out (fetches) the deceleration change rate learning value Jmn (n=2) that corresponds to the inter-vehicular time range to which the inter-vehicular time Tint belongs, from the lookup table LT. Subsequently, the CPU applies the averaged deceleration change rate Ja obtained at S240 and the read out "deceleration change rate learning value Jmn (n is a natural number from 1 to m)" to a right side of an equation (Jm=α·Ja+(1−α)·Jmn) so as to update the deceleration change rate learning value Jm (=Jmn). The CPU stores the updated deceleration change rate learning value Jm (=Jmn) into the lookup table LT, as the deceleration change rate learning value Jm corresponding to the inter-vehicular time range to which the inter-vehicular time Tint stored at S230 belongs.

<Calculation of a Required Inter-Vehicular Distance and Alert Control>

The CPU continues determining whether or not the current state becomes a new following preceding vehicle state (i.e., whether or not the above-described following preceding vehicle state condition is satisfied) by executing an unillustrated routine (refer to S220 in FIG. 2). When the CPU determines that the new following preceding vehicle state has occurred, the CPU executes a routine shown by a flowchart in FIG. 3 every time the predetermined time dt elapses, as long as the following preceding vehicle state continues.

Figure 3:
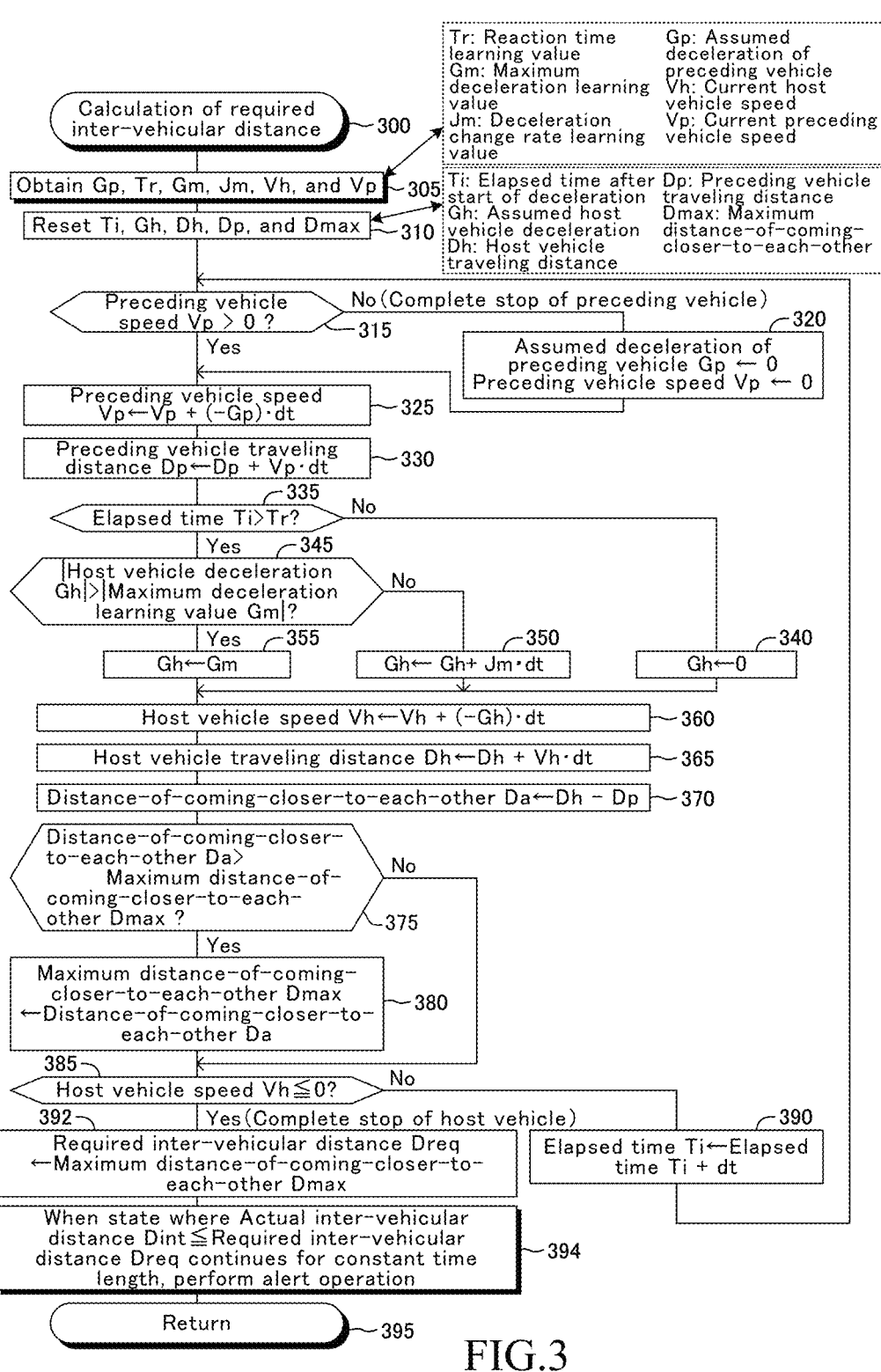
FIG. 3 shows a routine executed by the CPU of the driving support ECU shown in FIG. 1.

Accordingly, when the following preceding vehicle state continues occurring, the CPU starts processing from S300 shown in FIG. 3, and proceeds to S305. At S305, the CPU reads out (fetches) the learning values (i.e., the reaction time learning value Tr, the maximum deceleration learning value Gm, and the deceleration change rate learning value Jm) corresponding to the current inter-vehicular time Tint, from the look-up table LT shown in FIG. 2. Furthermore, as described later in detail, the CPU sets an assumed deceleration of the preceding vehicle Gp to a predetermined value that varies depending on road traffic information including a type of the road (road type) on which the host vehicle is traveling and a flow type (traffic flow) which is either a free flow or a congestion flow (refer to FIG. 5). In addition, the CPU obtains a current host vehicle speed Vh, and calculates a current preceding vehicle speed Vp based on the current host vehicle speed Vh and the relative speed Vr.

At S310, the CPU resets calculation variables including an elapsed time Ti from the present time point, a host vehicle deceleration Gh, a host vehicle traveling distance Dh that is a moving distance of the host vehicle from the present time point, a preceding vehicle traveling distance Dp that is a moving distance of the preceding vehicle from the present time point, and a maximum distance-of-coming-closer-to-each-other Dmax.

Subsequently, by executing processes of S315 and S320, the CPU sets each of the assumed deceleration of the preceding vehicle Gp and the preceding vehicle speed Vp to "0" (S320), when a calculated/computational preceding vehicle speed Vp is equal to or lower than "0" (i.e., when the preceding vehicle computationally fully stops, S315: No). Whereas, when the calculated/computational preceding vehicle speed Vp is higher than "0", the CPU maintains each of the assumed deceleration of the preceding vehicle Gp and the preceding vehicle speed Vp as they are (namely, the Gp and the VP remain unchanged). Subsequently, the CPU executes processes of S325 and S330 described below.

S325: The CPU updates the preceding vehicle speed Vp by adding a "product (−Gp·dt) of an acceleration (−Gp) of the preceding vehicle and the calculation cycle dt" to the previously updated preceding vehicle speed Vp.

S330: The CPU updates the preceding vehicle traveling distance Dp by adding a "product (Vp·dt) of the updated preceding vehicle speed Vp and the calculation cycle dt" to the previously updated preceding vehicle traveling distance Dp.

Subsequently, the CPU executes some of steps from S335 to S355 so as to update the host vehicle deceleration Gh. More specifically, up to a time point at which the elapsed time Ti reaches the reaction time learning value Tr (S335: No), the CPU sets the host vehicle deceleration Gh to "0" (S340).

Whereas, when the elapsed time Ti is longer than the reaction time learning value Tr (S335: Yes), the CPU updates the host vehicle deceleration Gh (S350) by adding a "product (Jm·dt) of the deceleration change rate learning value Jm and the calculation cycle dt" to the previously updated host vehicle deceleration Gh, if an absolute value of the host vehicle deceleration Gh is equal to or smaller than the absolute value of the maximum deceleration learning value Gm (S345: No), and the CPU sets the host vehicle deceleration Gh to the maximum deceleration learning value Gm (S355), if the absolute value of the host vehicle deceleration Gh is greater than the absolute value of the maximum deceleration learning value Gm (S345: Yes).

Subsequently, the CPU executes processes of steps from S360 to S370 described below.

S360: The CPU updates the host vehicle speed Vh by adding a "product (−Gh·dt) of the host vehicle acceleration (=−(host vehicle deceleration Gh)) and the calculation cycle dt" to the previously updated host vehicle speed Vh.

S365: The CPU updates the host vehicle traveling distance Dh by adding a "product (Vh·dt) of the host vehicle speed Vh and the calculation cycle dt" to the previously updated host vehicle traveling distance Dh. S370: The CPU updates/calculates the distance-of-coming-closer-to-each-other Da by subtracting the preceding vehicle traveling distance Dp from the host vehicle traveling distance Dh.

Subsequently, the CPU executes processes of S375 and S380 so as to set the maximum distance-of-coming-closer-to-each-other Dmax to the distance-of-coming-closer-to-each-other Da calculated at S370 (S380), when the distance-of-coming-closer-to-each-other Da calculated at S370 is greater than the previously updated maximum distance-of-coming-closer-to-each-other Dmax (S375: Yes). Whereas, when the distance-of-coming-closer-to-each-other Da calculated at S370 is equal to or smaller than the previously updated maximum distance-of-coming-closer-to-each-other Dmax (S375: No), the CPU maintains the previously updated maximum distance-of-coming-closer-to-each-other Dmax as it is (i.e., the CPU makes Dmax remain unchanged).

Thereafter, the CPU proceeds to S385, and determines whether or not the host vehicle speed Vh is equal to or lower than "0" (i.e., whether or not the host vehicle has computationally fully stopped). When the host vehicle speed Vh is higher than "0", the CPU proceeds to S390 from S385, and increases the elapsed time Ti by the calculation cycle dt. Thereafter, the CPU returns to S315.

Whereas, when the host vehicle speed Vh is equal to or lower than "0", the CPU proceeds to S392 from S385, and sets the required inter-vehicular distance Dreq to the maximum distance-of-coming-closer-to-each-other Dmax. Namely, the required inter-vehicular distance Dreq is equal to the maximum distance-of-coming-closer-to-each-other Dmax in a period up to a time point at which the host vehicle computationally fully stops. The CPU may set the required inter-vehicular distance Dreq to a value obtained by adding a predetermined positive value Ds to the maximum distance-of-coming-closer-to-each-other Dmax (i.e., a value that varies depending on the maximum distance-of-coming-closer-to-each-other Dmax).

Subsequently, the CPU proceeds to S394, and determines whether or not a "state where the actual current inter-vehicular distance Dint is equal to or shorter than the required inter-vehicular distance Dreq" continues for a pre-determined constant time length or longer. The "state where the actual inter-vehicular distance Dint is equal to or shorter than the required inter-vehicular distance Dreq" is referred to as a "short inter-vehicular distance state (or an insufficient inter-vehicular distance state)". When the short inter-vehicular distance state continues for the predetermined constant time length or longer, the CPU performs the alert operation. Namely, the CPU causes the alert/warning display device 51 to display an alert (e.g., a design and/or letters, for calling the driver's attention to notify the driver of the host vehicle that the inter-vehicular distance is too short), and causes the alert sound generation device 52 to generate an alert sound (e.g., a waring sound and/or a voice message, for calling the driver's attention to notify the driver of the host vehicle that the inter-vehicular distance is too short).

Figure 4A:
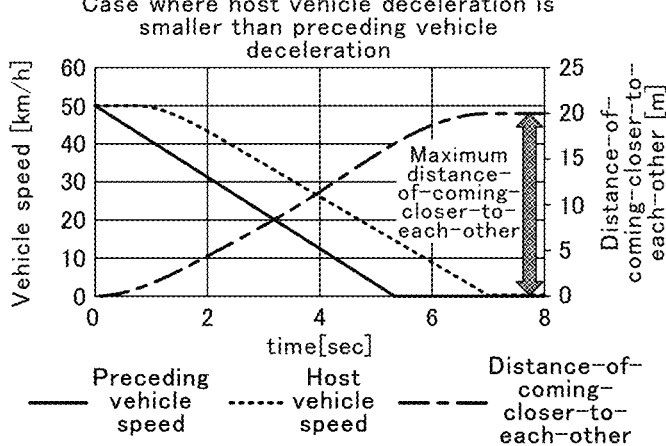
FIG. 4A is a graph for describing a maximum distance-of-coming-closer-to-each-other.
Figure 4B:
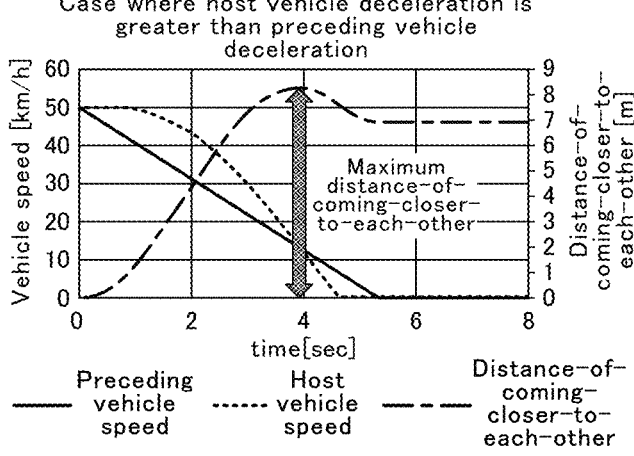
FIG. 4B is a graph for describing the maximum distance-of-coming-closer-to-each-other.
Figure 4C:
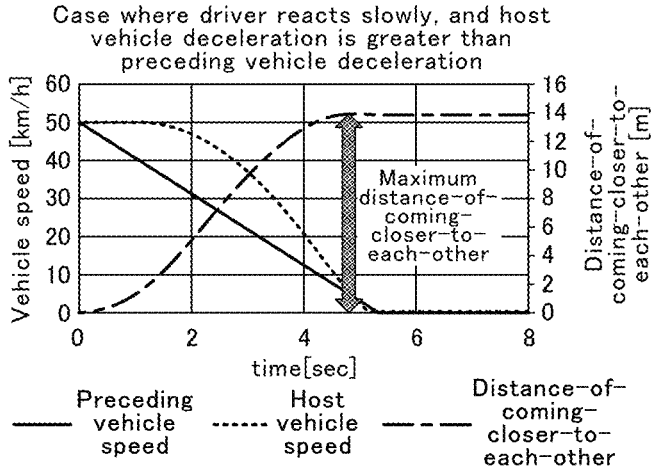
FIG. 4C is a graph for describing the maximum distance-of-coming-closer-to-each-other.

FIGS. 4A to 4C are graphs showing "the host vehicle speed, the preceding vehicle speed, the distance-of-coming-closer-to-each-other, and the maximum distance-of-coming-closer-to-each-other" calculated in the above-described manner. FIG. 4A shows those values when the maximum deceleration learning value Gm is smaller than the assumed deceleration of the preceding vehicle Gp (i.e., when the host vehicle decelerates more slowly than the preceding vehicle). FIG. 4B shows those values when the maximum deceleration learning value Gm is greater than the assumed deceleration of the preceding vehicle Gp (i.e., when the host vehicle decelerates more rapidly than the preceding vehicle). FIG. 4C shows those values when the maximum deceleration learning value Gm is greater than the assumed deceleration of the preceding vehicle Gp, but the driver of the host vehicle reacts slowly (i.e., the reaction time learning value Tr is relatively long).

<Obtainment of the Assumed Deceleration of the Preceding Vehicle Gp>

As described above, the CPU sets, at S305 shown in FIG. 3, the assumed deceleration of the preceding vehicle Gp to the value that varies depending on the type of the road on which the host vehicle is traveling and the flow type which is either the free flow or the congestion flow. Hereinafter, this point will be described.

Figure 5:
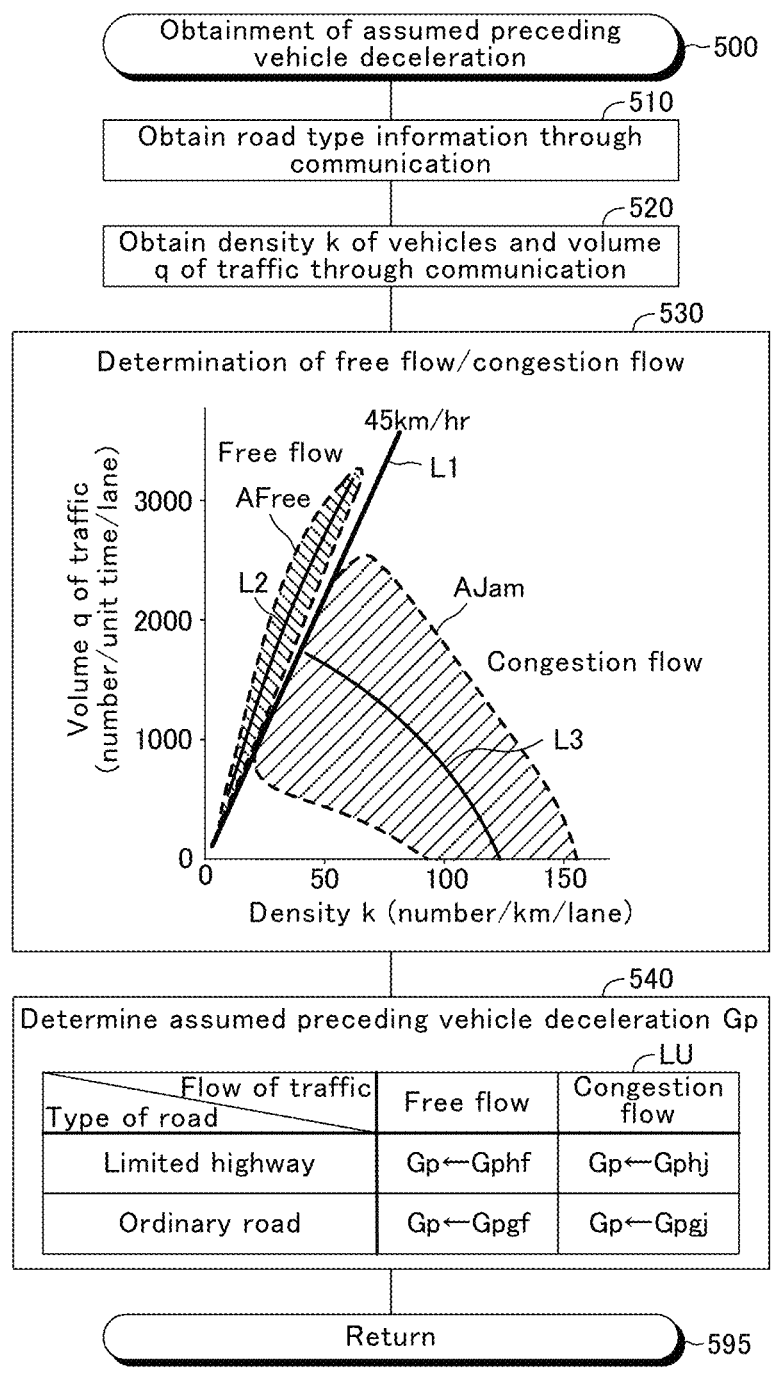
FIG. 5 shows a routine executed by the CPU of the driving support ECU shown in FIG. 1.

When the CPU proceeds to S305 shown in FIG. 3, the CPU starts processing from S500 shown in FIG. 5, and executes processes of steps from S510 to S540 described below sequentially. Thereafter, the CPU proceeds to S595 so as to terminate the present routine tentatively, and returns to S305 shown in FIG. 3.

S510: The CPU obtains "the road type information of the road on which the host vehicle is currently traveling" through the navigation ECU 60. It should be noted that the CPU may obtain the road type information from an external device through the communication ECU 70.

S520: The CPU obtains "the density k of vehicles and the volume q of traffic" of the road (lane) on which the host vehicle is currently traveling" from an external device through the communication ECU 70. It should be noted that the CPU may obtain the density k and the volume q through the navigation ECU 60.

S530: The CPU applies a traffic state point determined based on the density k and the volume q to a map shown in S530 in FIG. 5 so as to determine whether or not the traffic state point is in the upper side of a straight line L1. When the traffic state point is in the upper side of the straight line L1, the CPU determines that the flow of the traffic of the road on which the host vehicle is currently traveling is the flee flow (i.e., a natural flow where there is no traffic congestion). Whereas, when the traffic state point is in the lower side of the straight line L1, the CPU determines that the flow of the traffic of the road on which the host vehicle is currently traveling is the congestion flow (i.e., a flow where there is a traffic congestion). It should be noted that the following conclusions have been obtained by analyzing big data.

When the flow of the traffic is the flee flow, the traffic state point is within an area AFree that has a center line L2.

When the flow of the traffic is the congestion flow, the traffic state point is within an area AJam that has a center line L3.

When a velocity of the traffic flow (an average of speeds of vehicles belonging to a predetermined section of a focused road) is higher than 45 km/h (refer to the straight line L1), the flow of the traffic is the flee flow.

When the velocity of the traffic flow is lower than 45 km/h, the flow of the traffic is the congestion flow.

S540: The CPU applies "the road type (i.e., either the limited highway or the ordinary road) and the flow of the traffic (i.e., either the free flow or the congestion flow)" obtained through S510 to S530 as the road traffic information including information on circumstances of the road on which the host vehicle is traveling to a "lookup table LU shown in S540 and stored in the non-volatile memory", so as to determine the assumed deceleration of the preceding vehicle Gp. For example, the type of the road is the limited highway and the flow of the traffic is the free flow, the assumed deceleration of the preceding vehicle Gp is set at a value Gphf.

Figure 6A:
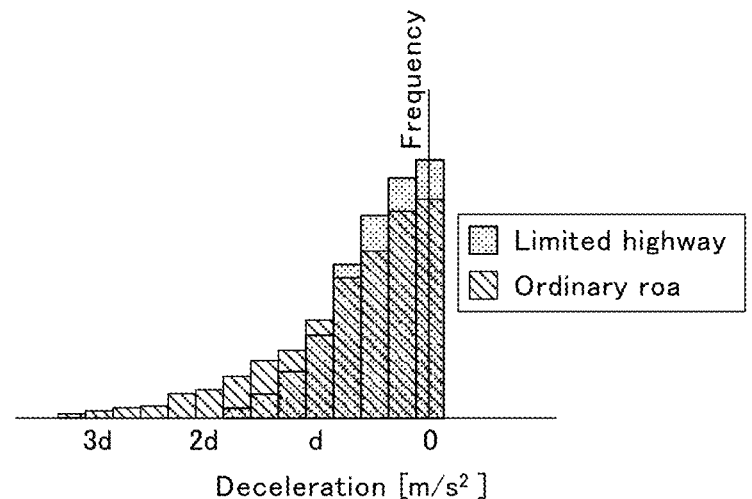
FIG. 6A is a graph for describing a frequency distribution of a deceleration of a vehicle.

Here, FIG. 6A shows a frequency distribution of the deceleration for each of a case where the type of the road is the limited highway and a case where the type of the road is the ordinary road, when the flow of the traffic is the free flow. As understood from this graph, there are less contributory factors for deceleration in the limited highway than in the ordinary road because there is substantially no intersection and no pedestrian in the limited highway, and thus, a frequency of a case where a vehicle is decelerated rapidly is low in the limited highway as compared to the ordinary road. For example, $2\sigma$ ($\sigma$=standard deviation) regarding the deceleration in a certain high way as the limited highway is 1.4 m/s, whereas, $2\sigma$ regarding the deceleration in a certain ordinary road is 2.6 m/s.

Figure 6B:
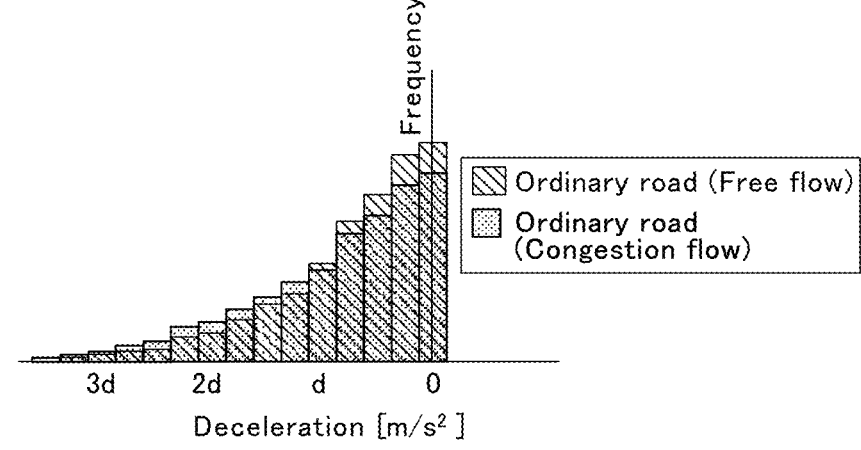
FIG. 6B is a graph for describing a frequency distribution of a deceleration of a vehicle.

FIG. 6B shows a frequency distribution of the deceleration for each of a case where the flow of the traffic is the free flow and a case where the flow of the traffic is the congestion flow, when the type of the road is the ordinary road. As understood from this graph, vehicles are frequently decelerated when the flow of the traffic is the congestion flow, and thus, a frequency of a case where a vehicle is decelerated rapidly is high in the case where the flow of the traffic is the congestion flow as compared to the case where the flow of the traffic is the free flow. In view of this, the assumed decelerations of the preceding vehicle Gp in the lookup table LU have been determined. It should be noted that each of the assumed decelerations of the preceding vehicle Gp stored in the lookup table LU has been set to a value corresponding to $2\sigma$ in the larger side of the distribution of the deceleration, in order for the alert not to be generated in a delayed fashion.

As has been described above, the embodiment according to the present disclosure updates/obtains "the operation characteristics learning values that are used to calculate the required inter-vehicular distance" based on "the operation characteristics values" that are obtained/measured during the critical situation in which the rapid approach condition is satisfied. Therefore, the operation characteristics learning values are values that can appropriately represent the operation characteristics of the driver in the critical situation where the preceding vehicle suddenly starts decelerating rapidly. Furthermore, since the assumed deceleration of the preceding vehicle Gp that is an imaginary deceleration of the preceding vehicle is obtained in accordance with the road traffic information (i.e., the information on the type of the road and the flow of the traffic), the required inter-vehicular distance is calculated based on the deceleration at which the preceding vehicle is likely to decelerate. Therefore, the alert operation can be performed at a more appropriate timing.

It should be noted that the present disclosure is not limited to the above embodiment, and may adopt various modifications within the scope of the present disclosure. For example, the present disclosure can be applied to an autonomous driving vehicle, when the vehicle driving mode is changed from an autonomous driving mode to a mode where the driver drives the vehicle. Furthermore, the CPU may determine the assumed deceleration of the preceding vehicle Gp based solely on either one of the type of the road and the flow of the traffic. In addition, the type of the road may be divided/classified in more detail, such as into a specific high way, and a specific segment of an ordinary road. The road traffic information obtained by the ECU 60 and the ECU 70 may include information indicating whether the flow of the traffic of the road on which the host vehicle is traveling is the congestion flow or the free flow. In this case, S520 and S530 can be omitted.

What is claimed is:

1. An alert apparatus, comprising:

a first obtaining device that obtains host vehicle information on a traveling state of a host vehicle, said host vehicle information including information on a host vehicle speed which is a speed of said host vehicle;

a second obtaining device that obtains preceding vehicle information including information on an actual inter-vehicular distance between a preceding vehicle and said host vehicle;

a third obtaining device that obtains road traffic information including information on circumstances of a road on which the host vehicle is traveling, wherein said third obtaining device is configured to obtain, as said road traffic information, (i) a type of said road on which said host vehicle is traveling and (ii) traffic jam information indicating whether a traffic flow of said road on which said host vehicle is traveling is a congestion flow or a free flow;

an alert device that performs, as an alert operation to call a host vehicle driver's attention, at least one of an alert display and an alert sound generation; and a controller that controls said alert device, wherein, said controller is configured to:

obtain an assumed deceleration of said preceding vehicle in accordance with said obtained road traffic information including said type of said road and said traffic jam information, said assumed deceleration being an imaginary deceleration of said preceding vehicle;

calculate a required inter-vehicular distance which said host vehicle should ensure between said host vehicle and said preceding vehicle, based on said host vehicle information, said preceding vehicle information, and said obtained assumed deceleration of said preceding vehicle;

cause said alert device to perform said alert operation, when an alert condition is determined to be satisfied, said alert condition including a condition to be satisfied when said obtained actual inter-vehicular distance is equal to or shorter than said calculated required inter-vehicular distance;

when said controller determines that a predetermined rapid approach condition becomes satisfied based on said host vehicle information and said preceding vehicle information, wherein said rapid approach condition is a condition to be satisfied when said host vehicle and said preceding vehicle start to come closer to each other rapidly in a following preceding vehicle state in which said host vehicle is following said preceding vehicle owing to a driving operation by a driver of said host vehicle, obtain, based on said host vehicle information, operation characteristics values representing characteristics of a deceleration operation performed by said driver of said host vehicle to decelerate said host vehicle after a time point at which said rapid approach condition becomes satisfied, and store operation characteristics learning values that vary depending on said operation characteristics values in a storing device; and when said controller determines that said following preceding vehicle state has newly occurred, calculate said required inter-vehicular distance, based on said operation characteristics learning values in addition to said host vehicle information, said preceding vehicle information, and said obtained assumed deceleration of said preceding vehicle.

* * * * *